United States Patent [19]

Hawkins

[11] 4,336,712

[45] Jun. 29, 1982

[54] VEHICULAR TEMPERATURE GAUGE

[76] Inventor: Robert S. Hawkins, 3002 Cascade view Rd., Sumner, Wash. 98390

[21] Appl. No.: 139,897

[22] Filed: Apr. 14, 1980

[51] Int. Cl.³ .............................................. G01K 13/02
[52] U.S. Cl. .................................... 374/138; 374/141
[58] Field of Search ................. 73/343 R, 349, 363.9, 73/368.6, 339 C, 378

[56] References Cited

U.S. PATENT DOCUMENTS

| | | | |
|---|---|---|---|
| D. 119,239 | 2/1940 | Fischer | 73/343 R |
| D. 162,098 | 2/1951 | Vacanti | 73/343 R |
| 1,429,975 | 9/1922 | Roth | 73/363.9 |
| 2,351,880 | 6/1944 | Sauer | 73/343 R |
| 2,638,785 | 5/1953 | Vacanti | 73/343 R |
| 2,878,673 | 3/1959 | Christensen | 73/343 R |
| 3,491,598 | 1/1970 | Wetterhorn | 73/363.9 |

FOREIGN PATENT DOCUMENTS

| | | | |
|---|---|---|---|
| 450600 | 8/1948 | Canada | 73/363.9 |
| 469971 | 12/1950 | Canada | 73/343 R |
| 1133082 | 3/1957 | France | 73/343 R |
| 1548986 | 10/1968 | France | 73/343 R |

OTHER PUBLICATIONS

NACA (National Advisory Committee for Aeronautics) 73-349 Memorandum 953.
Cenco Catalog, pp. 36 and 37.

Primary Examiner—Kyle L. Howell
Assistant Examiner—Denis E. Corr
Attorney, Agent, or Firm—Clinton L. Mathis

[57] ABSTRACT

A truck or automobile thermometer for mounting on the exterior of the vehicle and subject to outside weather conditions is shown. The sensing element of the thermometer is of the usual rod type with a capillary tube containing mercury, etc. A direct reading dial with a pointer is operatively associated with the rod and is disposed at right angles thereto. An externally threaded nipple is connected with the thermometer and is coaxially disposed on the rod element. An internally threaded tube surrounds the rod and is spaced therefrom to provide an air chamber around the rod-sensing element. This tube has an end opening to admit exterior air and side outlet means to exhaust air. A bracket having two legs, disposed at right angles to each other, is provided with a hole in one leg of smaller diameter than the threaded tube. Then such hole is passed over the threaded nipple and the tube is threadedly connected with the nipple, thus uniting the rod, bracket, and tube. Then the bracket has its other leg connected with an exterior surface of the automobile cab or body, as the bracket normally mounting an outside rearview mirror, so the direct reading dial of the thermometer is in the line of vision often used by the automobile operator.

2 Claims, 7 Drawing Figures

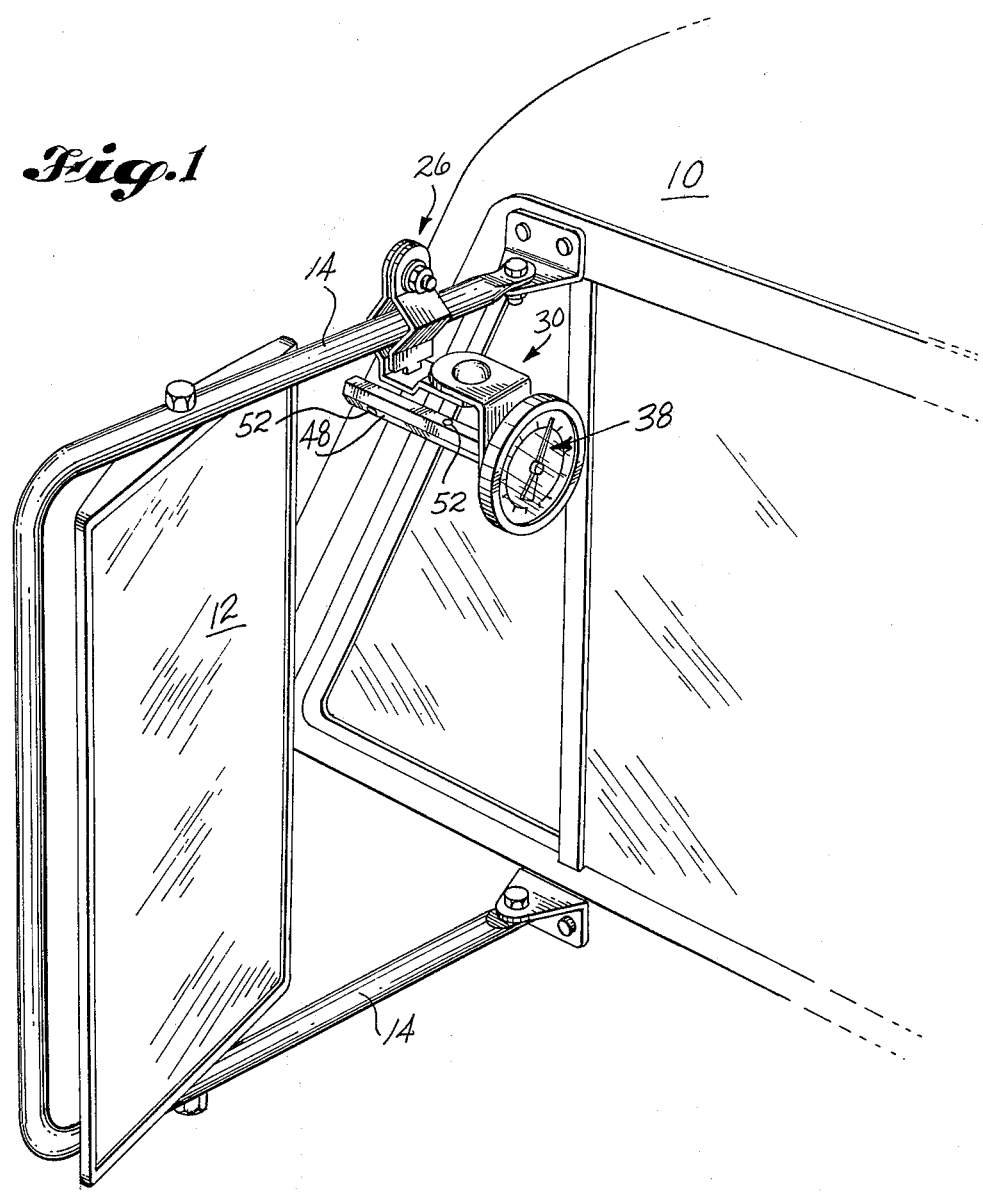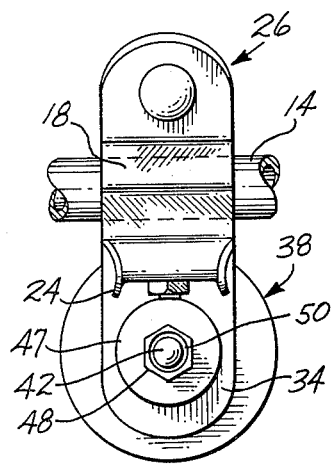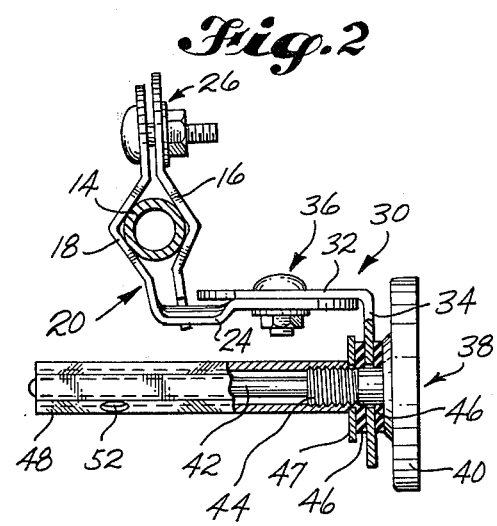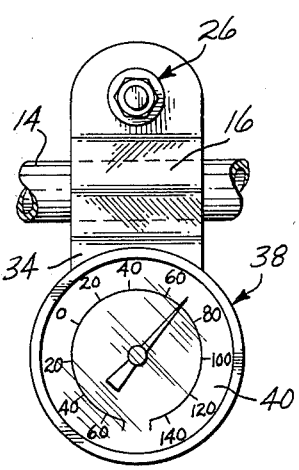

VEHICULAR TEMPERATURE GAUGE

BRIEF SUMMARY OF THE INVENTION

When the temperature suddenly rises and if there should be ice on a highway, a critical, slippery condition of ice and water is usually present for vehicles traveling on such a highway. Also, if the highway is wet and the temperature suddenly declines, often we have a condition of ice and water on the highway and again a critical, slippery condition. Such conditions may be very local and the driver of a vehicle is often not warned of such conditions by weather forecasts, radio warnings, CB's, or the like. Thus, there is a demanding need, not heretofore met, for a thermometer to indicate weather conditions outside the generally heated interior of an automobile. Also, such thermometer must be direct reading for ready driver reaction and positioned in the path of vision normally employed by the vehicle operator in driving the vehicle, otherwise, the vehicle operator may glance at the dial infrequently and not often enough to note a sudden change of temperature. The proper location of the dial of the thermometer is one where the operator will often look and one which will not interfere with the normal path of vision in driving the vehicle for safe operation thereof. Notice of the sudden change is the key to anticipate changes in road conditions.

The particular embodiment of the present thermometer includes a thermometer having a temperature-sensing element of the usual rod type, with a capillary tube containing mercury, etc. A direct reading dial and pointer for easy reading and prompt reaction by the vehicle operator is employed. An externally threaded nipple is connected with the thermometer and encircles the thermometer rod. In one form of the invention, bracket means formed of two right angle brackets is employed. This provides for a universal connection and the thermometer dial is univerally adjustable to the line of vision of a particular vehicle operator. One of the right angle brackets has one leg thereof provided with a hole which snugly fits over the threaded nipple. Then the internally threaded tube, of a size larger than the hole in such leg, or a nut is threadedly connected with the nipple to mount the thermometer on this right angle bracket. Then a second right angle bracket is connected to the first right angle bracket by a single bolt permitting a second pivotal connection, and thus a universal connection. Then the second right angle bracket is secured to an exterior projecting member carried by the automobile. With the universal connection, the direct reading thermometer dial may be positioned in the line of vision often used by the automobile driver in driving the vehicle, such as to secure the bracket to the external rearview mirror support of the automobile. The internally threaded tube is larger than the temperature rod to provide an air space chamber around such thermometer rod. Also, an air inlet, preferably at the end of such threaded tube, is provided with exhaust holes, preferably on the sides so that the temperature in the air space surrounding the temperature rod will be that of the outside air ambient to the automobile.

The above-mentioned details, advantages, and objects of my invention will become implicit and explicit as the description of my invention proceeds in connection with the drawings, wherein like reference numerals refer to like parts.

BRIEF DESCRIPTION OF THE SEVERAL VIEWS OF THE DRAWING

FIG. 1 is a perspective, fragmentary view showing a portion of the side, roof, windshield, and outside rearview mirror of an automobile and with the device embodying my invention secured to the outside rearview mirror mounting frame;

FIG. 2 is an elevational view of my device, with parts thereof broken away, and showing in section portions of the rearview mirror mounting frame and thermometer parts;

FIG. 3 is a front elevation of the structure shown in FIG. 2;

FIG. 4 is a view of the structure shown in FIG. 2 and taken from the opposite side to that of FIG. 3;

DETAILED DESCRIPTION

Figure 5:
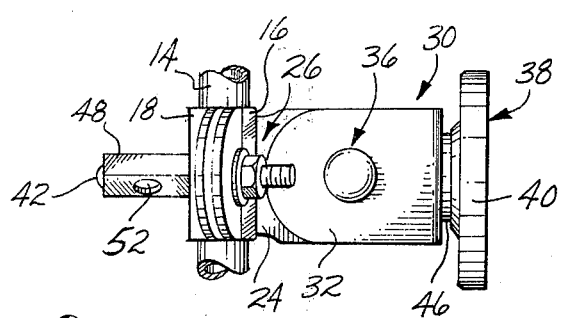
FIG. 5 is a top view of the structure of FIG. 2.
Figure 6:
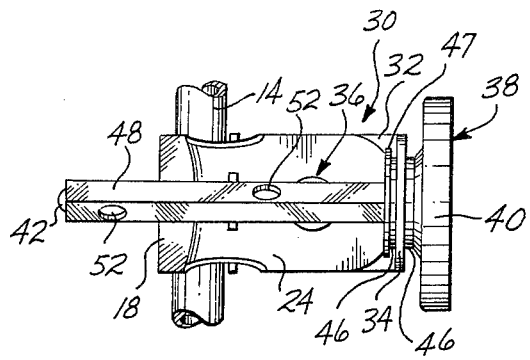
FIG. 6 is a bottom view of the structure of FIG. 2.

A body of a passenger vehicle or cab of a truck 10 is illustrated by the fragment shown in FIG. 1. Such a vehicle is equipped with an outside rearview mirror 12 supported by a mounting frame which includes a horizontal tube or rod 14. In the form of my invention shown in FIGS. 1 to 6, inclusive, a clamp is provided to secure my device to such tube 14. This clamp comprises a plate 16 and the plate or leg 18 of a right angle bracket 20. This bracket 20 is formed of two legs or plates 18 and 24 disposed at right angles to each other. The plates 16 and 18 have their mid portions, each bent outwardly to encompass and to hold tightly the tube 14 so that the right angle bracket 20 will not shift as respects the tube 14 after the nut-and-bolt means 26 is tightened. In the form as shown, the lower end of the plate 16 engages a hole in plate 24. Plate 16 passes upwardly and bulges over the outside of tube 14 and then the upper end portions of plates 16 and 18 are adjustably secured together by means of nut-and-bolt means 26, with the bolt thereof being headed, the shank thereof passing through aligned holes in plates 16 and 18, and the nut thereof threaded on the shank and releasably securing the several parts together. The lower outside edges of plate 24, at the area of the right angle corner, are flared for strengthening purposes. The plate 16 and the right angle bracket 20 may be readily and economically fabricated by a stamping process and the nut-and-bolt means 26 is a standard article of commerce.

The leg or plate 24 is secured to a second right angle bracket 30 formed of two legs or plates 32 and 34. Registering holes are provided in the plates 32 and 24 so the said plates may be detachably secured together by nut-and-bolt means 36 and the right angle bracket 20 may be turned relative to the second right angle bracket 30 about a vertical pivot provided by the nut-and-bolt means 36. Also, the right angle bracket 20 is movable about tube or rod 14 with tube or rod 14 providing a horizontal axis for such movement. By providing a horizontal as well as a vertical axis for movement, my device supported by the plate 34 is provided with universal movement so that the thermometer 38 may be suitably adjusted to be in the line of vision of a particular driver driving the vehicle indicated by the fragment 10. It is of key importance that the thermometer, indicated generally by 38 have its dial positioned in the normal plane of vision of a particular driver in checking the rearview mirror 12 from time to time so that the driver will know immediately if there is any sudden rising or falling of temperature indicated by the thermometer 38.

A direct reading thermometer, generally numbered 38, is provided with a direct reading dial 40 and a thermal sensing tubular member 42 operatively connected with the said direct reading dial. As the thermometer in question can be readily obtained on the market as a standard article, no further details are illustrated or described. Connected integrally with the thermometer 38 is an externally threaded nipple 44 (see FIG. 2). This nipple 44 is coaxially disposed relative to the thermometer tube 42.

The thermometer 38 is mounted on a plate or leg 34 by first passing a rubber washer 46 onto nipple 44 and against the inner surface of the direct reading dial head 40, then inserting sensing tube 42 through a hole in plate or leg 34. Then a second rubber washer 46 is placed over sensing tube 42 and over the said nipple 44 and against the other side of plate or leg 34. Then a metal washer 47 is inserted over sensing tube 42 and over the said nipple 44. Then internally threaded tube 48 is placed over sensing tube 42 and threadedly connected with the externally threaded nipple 44 and the threading continues until the thermometer 38 is connected with the leg or plate 34 and cushioned therefrom by rubber washers 46. Obviously, the internally threaded tube 48 functions as a nut and may be replaced by a nut if the protection of a shield or metal tube over thermometer tube 42 is not desired.

The tube 48 is of a size to provide an air space between it and the thermal-sensing tube 42. External air is circulated through such air space so the temperature of such air space is that of the atmosphere ambient and external of the vehicle 10. This may be accomplished by air in the hole 50 and air exhaust holes 52. Thus, the tube 48 functions as a shield but does not interfere with circulation of air about the thermal-sensing tube 42.

The form of my invention shown in FIGS. 1 to 6, is adapted to be secured to any horizontal, diagonal, or vertical bar, tube, channel, angle and because of its universal connections, the thermometer can be located in the desired line of vision of the driver of a vehicle 10.

Figure 7:
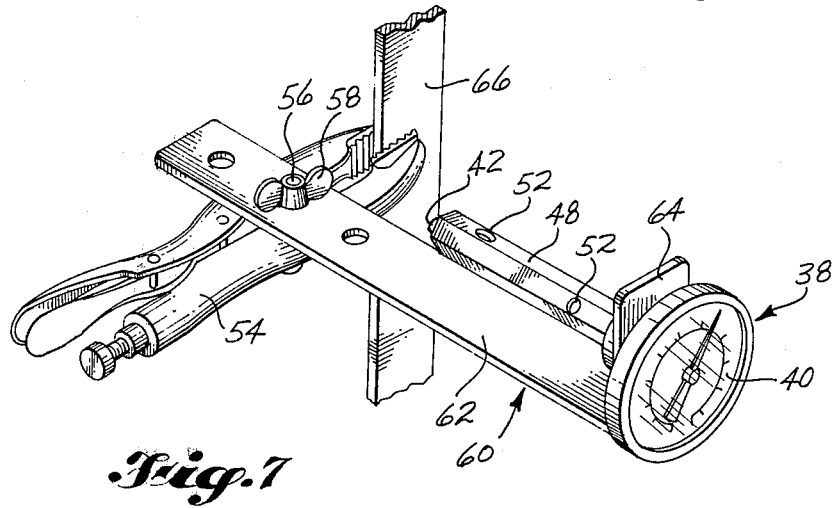
FIG. 7 is a perspective view of an alternative construction for attachment of my device to many external portions of an automobile.

Sometimes the exterior of the automobile is not equipped with an appropriate member for mounting the structure of FIGS. 1 to 6 or it is desired to use the universal mounting means shown in FIG. 7. This form of my invention has many advantages over that shown in the previous figures. There are many professional drivers of trucks on the highways who drive a different vehicle each time they are dispatched. Often the power unit of a "semi" is changed without the change of a driver. The unit shown in FIG. 7 is portable and may be the personal property of the driver and carried by him and then quickly and easily attached to a particular vehicle he is then driving. Also, the unit of FIG. 7 is universal in that it may be readily attached to almost any protruding member from the cab of a vehicle and need not be purchased for and used on any particular vehicle. In this construction, a pair of locking pliers 54, a brand thereof being sold on the market as "VISE-GRIPS", has a threaded rod 56 welded to one of its jaw members. A right angle bracket 60 has one of its legs 62 provided with a hole through which the threaded rod 56 is projected. Wing nut 58 secures rod 56 and thereby locking pliers 54 to leg 62 of right angle bracket 60. Locking pliers 54 has its jaws secured to any suitable projecting member 66 of the automobile 10. The jaws of the locking pliers can be adjusted to be secured to most any shaped object within the operative range of movement of its jaws. The leg 62 is angularly adjustable about rod 56 as a center to provide the desired position of the thermometer 38 secured to the leg 64 of the right angle bracket 60 in the same manner it was secured to the leg 34 of the bracket 30 of the previous figures.

RESUMÉ

It will now be obvious that I have provided a vehicular temperature gauge comprising a thermometer 38 having a temperature-sensing rod element 42; a direct reading dial 40 connected with the sensing rod or tube 42 and with the dial 40 disposed at right angles to the sensing rod or tube 42. Also, an externally threaded nipple 44 is connected with the thermometer and is coaxially disposed on the thermal-sensing rod or tube element 42. An internally threaded tube 48 functions as a nut and protective cover for the tube 42. This tube 48 has threads matching the threads of the externally threaded nipple 44 and the size of the externally threaded tube 48 is such as to provide an air chamber, directly exposed to atmospheric conditions, between it and the thermal-sensing rod or tube 42. So that the temperature of such air in this chamber is the same as that of air external of the automobile cab and ambient thereto, air inlet hole 50 and exhaust holes 52 are provided. Bracket means are provided for detachable connection with the thermometer 38 by having a hole in one leg of a right angle bracket so that preferably a rubber washer 46 is inserted over the threaded nipple 44 and then the thermal-sensing tube 42 and the nipple 44 are inserted through such hole. Next, another rubber washer 46 is placed over the threaded nipple 44 and against the other side of the leg of the bracket, as leg 34. Then, instead of using a nut or other means, an internally threaded tube 48 is provided and suitably connected with the threads of the externally threaded nipple 44. The right angle bracket 30 is connected about a vertical pivot provided by nut-and-bolt means 36 with another right angle bracket 20. The latter mentioned right angle bracket 20 comprises the plate 18 right angularly disposed as respects the plate or leg 32. The leg 18 cooperates with plate 16 to provide a clamp and by use of the nut-and-bolt means 26, the right angle bracket 18, 24 can be secured to any suitable tube external of the automobile cab 10, such as tube or rod 14 of the mounting means for the rearview mirror 12.

The structure shown in FIGS. 1 to 6, inclusive, provides for universal mounting in that the thermometer 38 is mounted for movement about the vertical axis of nut-and-bolt means 36 and also mounted for movement about the horizontal axis indicated by the tube or rod 14 of the rearview mirror.

The structure of FIG. 7 provides a device utilizing locking pliers in the means attaching it to a vehicle. This provides for portable and universal connections. The universal connection means that it is not necessary to originally purchase a device with a particular vehicle or a particular rearview mirror construction in mind. The advantage of a portable connection is that the operator obtains the unit as his personal property and he transfers the unit from vehicle to vehicle as he changes in driving one or more vehicles.

Obviously, changes may be made in the forms, dimensions, and arrangement of the parts of my invention without departing from the principle thereof, the above setting forth only preferred forms of embodiment of my invention.

I claim:

1. A vehicular temperature gauge comprising a thermometer having a temperature-sensing rod element; a direct reading dial connected with said sensing rod and disposed at right angles thereto; an externally threaded nipple connected with said thermometer and coaxially disposed on said rod element; a first washer disposed on said rod element and disposed adjacent said thermometer; bracket means disposed on said threaded nipple and having two opposite surfaces, one surface thereof abutting said washer, said bracket means providing a unit for detachably mounting the thermometer on a vehicle; a second washer disposed on said rod element and disposed adjacent the opposite surface of the bracket means; an internally threaded tube surrounding said rod element in spaced relation thereto, providing a chamber between it and the rod element, threadedly connected with the threaded nipple, and disposed to urge said second washer against the opposite surface of the bracket means, said tube being provided with means to connect the chamber with external air conditions; and readily detachable mounting means connected with said bracket and mounting said unit on the exterior of a vehicle and at a location within the area of the normal view of the operator of the vehicle.

2. The combination of claim 1, where locking pliers are employed as the mounting means connected with said bracket and mounting said unit on the exterior of a vehicle.

* * * * *